(12) United States Patent
Klingenberg et al.

(10) Patent No.: US 8,316,375 B2
(45) Date of Patent: Nov. 20, 2012

(54) LOAD-BALANCING OF PROCESSES BASED ON INERTIA

(75) Inventors: Bernhard J. Klingenberg, Morgan Hill, CA (US); Mark A. Smith, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 474 days.

(21) Appl. No.: 12/694,146

(22) Filed: Jan. 26, 2010

(65) Prior Publication Data

US 2011/0185366 A1   Jul. 28, 2011

(51) Int. Cl.
*G06F 9/46* (2006.01)
*G06F 15/173* (2006.01)
(52) U.S. Cl. ......... 718/105; 718/104; 709/223; 709/226
(58) Field of Classification Search .................. None
See application file for complete search history.

(56) References Cited

U.S. PATENT DOCUMENTS

| | | | |
|---|---|---|---|
| 7,065,549 B2 * | 6/2006 | Sun et al. ...................... | 709/201 |
| 8,046,468 B2 * | 10/2011 | Isci et al. ...................... | 709/226 |
| 8,095,929 B1 * | 1/2012 | Ji et al. .............................. | 718/1 |
| 2006/0259799 A1 | 11/2006 | Melpignano et al. | |
| 2007/0226744 A1 | 9/2007 | Callaway et al. | |
| 2007/0294578 A1 * | 12/2007 | Qiao et al. ...................... | 714/17 |
| 2008/0216087 A1 | 9/2008 | Dillenberger et al. | |
| 2010/0191854 A1 * | 7/2010 | Isci et al. ...................... | 709/226 |
| 2010/0257269 A1 * | 10/2010 | Clark ............................. | 709/226 |
| 2011/0047555 A1 * | 2/2011 | Lakshmanan et al. ......... | 718/105 |
| 2011/0185366 A1 * | 7/2011 | Klingenberg et al. ......... | 718/105 |
| 2012/0042312 A1 * | 2/2012 | Isci et al. ........................... | 718/1 |

OTHER PUBLICATIONS

Silaghi, et al., Object Distribution with Local Information, pp. 0381, 21st IEEE Intl Conf on Distributed Computing Systems (ICDCS'01), 2001.

* cited by examiner

*Primary Examiner* — Jennifer To
(74) *Attorney, Agent, or Firm* — Feb R. Cabrasawan

(57) ABSTRACT

A process is selected for movement from a current node to a new node, based on an inertia of the process. The inertia is a quantified measure of the impact resulting from the process being inaccessible while being moved. The inertia can take into account the number of current external connections to the process; the larger the number of current external connections is, the greater the inertia. The inertia can take into account the extent to which the process accepts external connections; the greater the extent to which the process accepts external connections is, the greater the inertia. The inertia can take into account the desired availability of the process; the greater the desired availability is, the greater the inertia. The inertia can take into account a specified quality of service of the process; the higher the specified quality of service is, the greater the inertia.

15 Claims, 5 Drawing Sheets

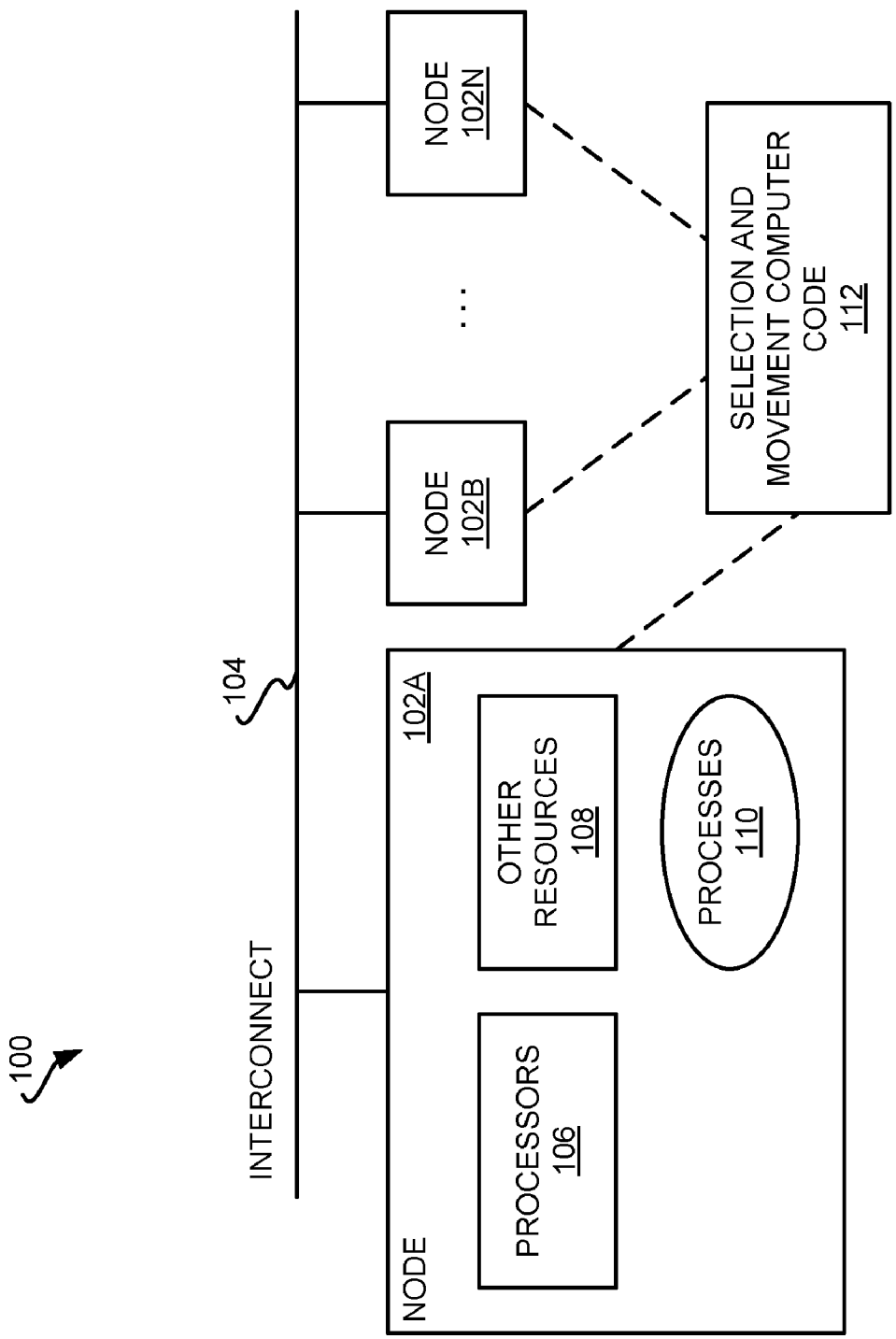

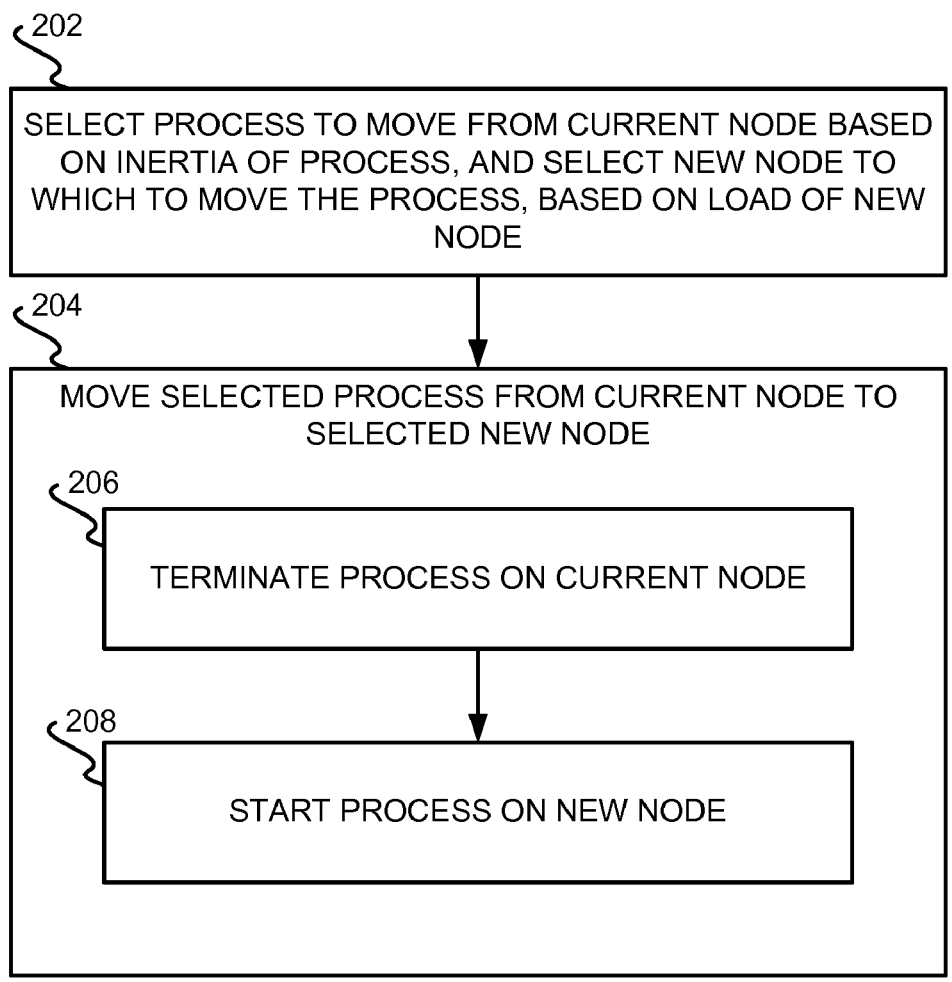

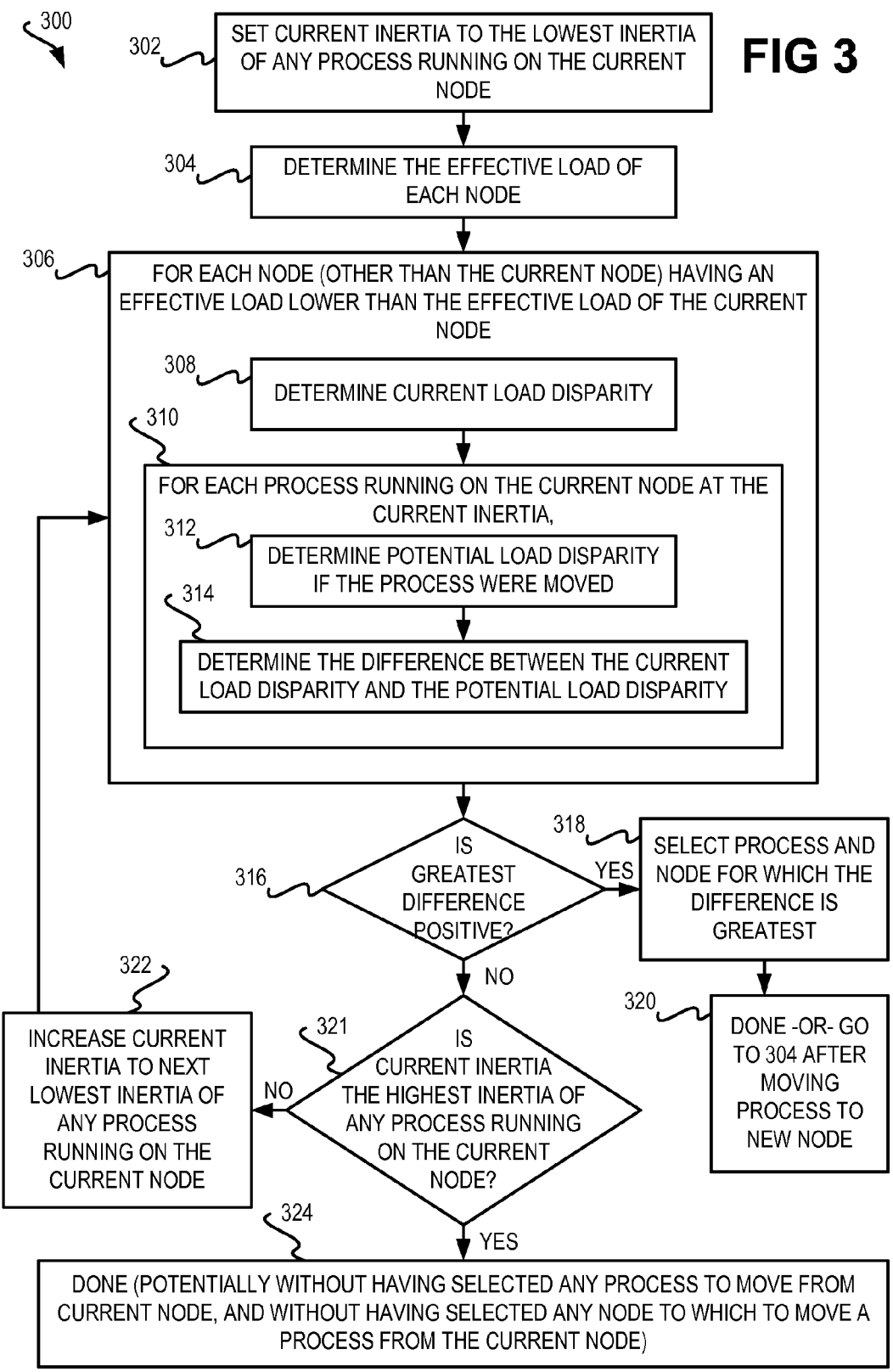

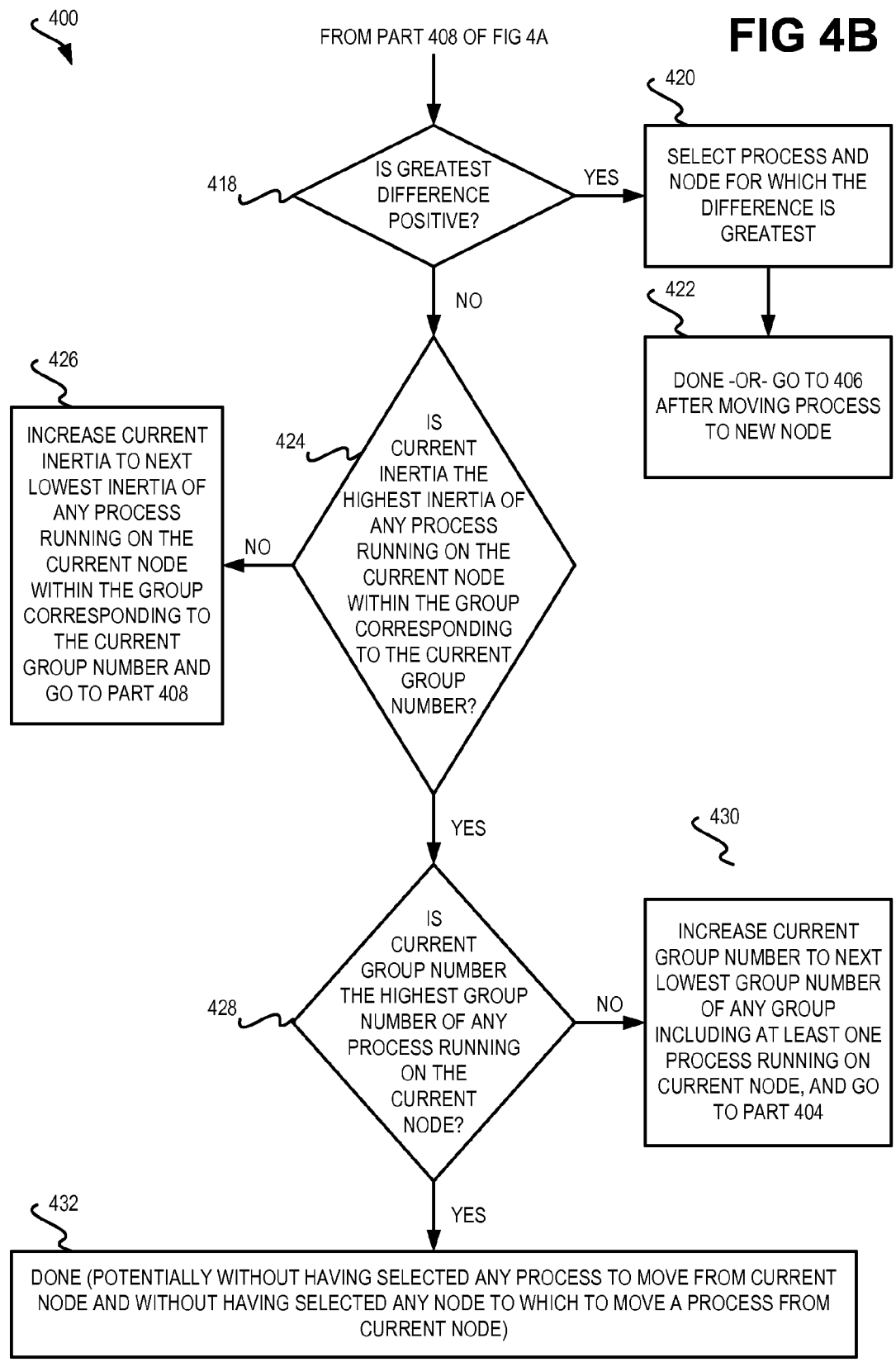

LOAD-BALANCING OF PROCESSES BASED ON INERTIA

FIELD OF THE INVENTION

The present invention relates generally to load balancing processes over a number of nodes, and more specifically to performing such load balancing based on the inertia of the processes. The inertia of a process is a quantified measure of the impact resulting from the process being inaccessible while being moved from one node to another node.

BACKGROUND OF THE INVENTION

A process is a running instance of at least a portion of a computer program. Typically, a given computing device runs a number of processes at any given time. To ensure that the processes are executed with a desired performance, there may be a cluster, or group, of computing devices, or portions of computing devices. The individual computing devices or computing device portions are referred to as nodes. Some processes may have executing instances on more than one node, whereas other processes may be constrained to have just one executing instance in a given group or cluster, and therefore may be running on just one node in the group of cluster in question. These latter processes are referred to as singleton processes, because they are executed on just a single node.

Occasionally a process, particularly a singleton process, may have to be moved from its current node to a new node within the cluster or group of nodes. For example, the current node on which the process has been executing may have failed, necessitating that the process be moved to a new node. As another example, nodes may be added to the cluster or group, such as when the nodes come back online after having failed or otherwise after having been taken offline. In this case, one or more processes may be moved to the added nodes. The movement of processes among the nodes of a cluster or group is referred to as load balancing.

SUMMARY OF THE INVENTION

A method of an embodiment of the invention selects a process to move from a current node of a number of nodes to a new node of the number of nodes, based on an inertia of the process. The method moves the process from the current node to the new node. The inertia of the process is a quantified measure of an impact resulting from the process being inaccessible while being moved from the current node to the new node.

A computer-readable storage medium of an embodiment of the invention has computer-readable code stored thereon for execution by a processor of a computing device. The computer-readable code includes computer-readable code to select a process to move from a current node of a number of nodes to a new node of the number of nodes, based on an inertia of the process. The computer-readable code also includes computer-readable code to move the process from the current node to the new node. The inertia of the process is a quantified measure of an impact resulting from the process being inaccessible while being moved from the current node to the new node.

A computing system of an embodiment of the invention includes a number of nodes including a current node and a new node. Each node includes a processor. The computing system further includes computer-readable code executed by the processor of at least one of the nodes. The computer-readable code selects a process to move from the current node to the new node, based on an inertia of the process, and moves the process from the current node to the new node. The inertia of the process is a quantified measure of an impact resulting from the process being inaccessible while being moved from the current node to the new node.

BRIEF DESCRIPTION OF THE DRAWINGS

FIG. 1 is a diagram of a computing system having a number of nodes between which processes can be moved, according to an embodiment of the invention.

FIG. 2 is a flowchart of a method for selecting and moving a process between one node and another node, according to an embodiment of the invention.

FIG. 3 is a flowchart of a method for selecting and moving a process between one node and another that is more detailed than but consistent with the method of FIG. 2, according to an embodiment of the invention.

FIGS. 4A and 4B are flowcharts of a method for selecting and moving a process between one node and another that is more detailed than but consistent with the method of FIG. 2, according to another embodiment of the invention.

DETAILED DESCRIPTION OF THE DRAWINGS

Figure 4A:
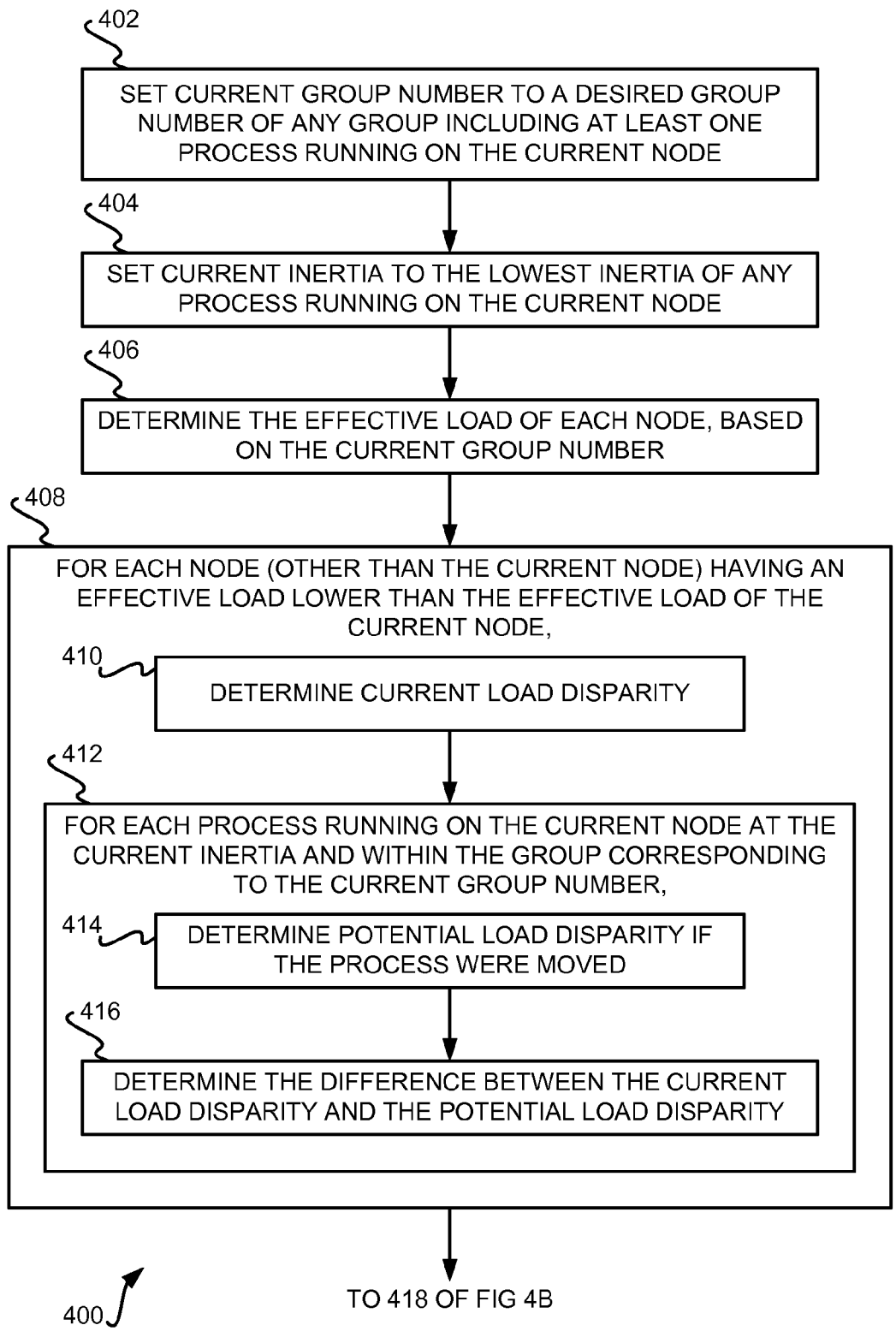

As noted in the background section, occasionally a process has to be moved from its current node within a group of nodes to a new node within the group of nodes. This load balancing process is performed so that no node within the group of nodes is overburdened with processes while there are one or more nodes within the group of nodes that are relatively unburdened with processes. Desirably, load balancing can result in all the nodes within the group having roughly the same load, in terms of the amount or portion of resources currently being utilized by the processes running on the nodes.

Conventionally, load balancing takes into account the load of a node from which a process is being moved, and the load of a node to which the process is being moved. If movement of a process from one node to another node were to result in a more equitable distribution of the processes between the nodes, in that the loads of the nodes are less disparate, then the processed is moved. In this way, processes are moved among the nodes of a group of nodes to achieve load rebalancing.

A novel insight of the present disclosure is that some processes are more amenable to movement to new nodes than other processes are. For example, a process may currently have a large number of external connections to clients outside the group of nodes. Moving the process from one node to another results in these external connections being closed prior to terminating the process on its current node, and then having to be reopened after the process is started on a new node. While the process is being moved, any processing being performed by the clients as a result of their connections to the process is disrupted. Therefore, it is more desirable to move a process that does not have any external connections to clients outside the group of nodes.

Embodiments of the invention thus select a process to move from a current node to a new node based on what is referred to herein as the inertia of the process. The inertia of the process is a quantified measure of the impact resulting from the process being inaccessible while being moved from the current node to the new node. Desirably, the process that is selected to be moved from the current node to a new node has low inertia, which means that the impact resulting from the process being inaccessible while being moved is low.

This inventive concept of inertia can take into account a number of different factors. One factor is the number of current external connections to a process; the larger the number of current external connections is, the greater the process's inertia. Another factor is the extent to which a process accepts external connections; the greater the extent to which the process accepts external connections is, the greater the process's inertia. A third factor is the desired availability of a process; the greater the desired availability is, the greater the process's inertia. A further factor is the specified quality of service of a process; the higher the specified quality of service is, the greater the process's inertia.

FIG. 1 shows a representative computing system 100, according to an embodiment of the invention. The system 100 includes a number of nodes 102A, 102B, . . . , 102N, collectively referred to as the nodes 102. The nodes 102 are communicatively connected to one another over an interconnect 104. There are at least two nodes 102 within the system 100.

Each node 102 can be a computing device, or a portion of a computing device. For example, in the latter case, a computing device may be partitioned into a number of hardware partitions, in which each hardware partition has its own dedicated processor. Each hardware partition may have its own dedicated memory, or may share memory with one or more other hardware partitions.

The interconnect 104 may be a network, and/or another type of interconnect, such as an input/output (I/O) bus or other type of bus that communicatively connects the nodes 102 with one another. Where the interconnect 104 is a network, the network may be or include the Internet, an intranet, an extranet, a local-area network (LAN), a wide-area network (WAN), a telephony network, and so on. The interconnect 104 typically includes a bus where at least two of the nodes 102 are portions of the same computing device.

The node 102A is depicted in detail in FIG. 1, as exemplary of all the nodes 102. The node 102A includes one or more processors 106, as well as other resources 108. The other resources 108 are other hardware resources, such as storage devices like hard disk drives, memory like dynamic random access memory, and so on. A number of processes 110 are run on the node 102A, in that the processors 106 execute the processes 110 and in that the processes 110 use the resources 108 of the node 102A.

The processes 110 are particularly singleton processes, as opposed to distributed processes. A singleton process runs just on one node. By comparison, a distributed process concurrently runs on more than one node. Therefore, the processes 110 run on just the node 102A, and not on any of the other nodes 102.

The computing system 100 includes selection and movement computer code 112. The computer code 112 may be symmetrically run on each node 102, in that when a process on a given node is to move to a different node, the computer code 112 on the given node and/or the different node is responsible for moving the process. Alternatively, the computer code 112 may run on a particular node 102 that is responsible for selection and movement of a process from any node to any other node. In one embodiment, the computer code 112 may be implemented as a decision engine.

FIG. 2 shows a method 200 that is performed by the computer code 112, according to an embodiment of the invention. The method 200 selects a process currently running on a current node based on the inertia of the process, and selects a new node to which the process is to be moved based on the load of the new node (202). As has been described above, the inertia of a process is a quantified measure of the impact that results from the process being inaccessible while being moved from the current node to a new node. The inertia can take into account any of a number of different factors that affect the impact of a process being inaccessible while it is being moved between nodes. Four exemplary factors are described herein.

A first factor is the number of connections to a process from outside the nodes 102, such that the larger this number of connections is, the greater the process's inertia. For example, a number of client computing devices external to the nodes 102 may be currently connected to a first process, whereas a lesser number of such devices may be currently connected to a second process. The impact resulting from the first process being inaccessible while it is being moved between nodes is greater than the impact resulting from the second process being inaccessible while it is being moved between nodes. This is because while the first process is inaccessible, the connections between the client computing devices and the first process have to be severed to terminate the first process from the current node, and then have to be initiated again after the first process has been restarted on the new node. Therefore, the inertia of the first process is higher than the inertia of the second process.

A second factor is the extent to which a process accepts connections from outside the nodes 102, such that the greater the extent to which the process can accept such connections, the greater the process's inertia. For example, a first process may be responsible for handling requests from client computing devices external to the nodes 102 even though the first process is not currently handling any requests from such client computing devices. By comparison, a second process may not be responsible for handling requests from client computing devices external to the nodes 102. The impact resulting from the first process being inaccessible while it is being moved between nodes is greater than the impact resulting from the second process being inaccessible while it is being moved between nodes. This is because while the first process is inaccessible, external client computing devices may attempt to send requests to the first process, which will fail since the first process is inaccessible, whereas no such devices will attempt to send requests to the second process while it is inaccessible. Therefore, the inertia of the first process is higher than the inertia of the second process.

A third factor is the desired availability of a process, such that the greater the desired availability is, the greater the process's inertia. For example, a first process may have to be available 99+% of the time to perform processing tasks, whereas a second process may just have to be available 95+% of the time to perform processing tasks. The impact resulting from the first process being inaccessible while it is moved between nodes is greater than the impact resulting from the second process being inaccessible while it is moved between nodes. This is because while each process is inaccessible, it is unavailable, and since the first process has to be available more of the time than the second process does, inaccessibility of the first process has a greater impact than inaccessibility of the second process does. Therefore, the inertia of the first process is higher than the inertia of the second process.

A related fourth factor is the specified quality of service (QoS) of a process, such that the greater the specified QoS is, the greater the process's inertia. QoS may take into account the desired availability of the process, as well as other factors that are impacted when the process is inaccessible. For example, a first process may have a high QoS rating, whereas a second process may have a low QoS rating. The impact resulting from the first process being inaccessible while it is moved between nodes is greater than the impact resulting from the second process being inaccessible while it is moved between nodes. This is because while each process is inaccessible, it is unavailable, and since the first process has to attain a higher QoS than the second process does, inaccessibility of the first process has a greater impact than inaccessibility of the second process does. Therefore, the inertia of the first process is higher than the inertia of the second process.

The inertia of a process can be static or dynamic. A static inertia may be predetermined and specified by a user. For example, a user may specify that a given process has an inertia on some numeric scale, such as between one and ten. The user assigns an inertia to each process, based on the expected behavior and attributes of the process, taking into account factors such as those described above. A dynamic inertia may be periodically redetermined, such as each time the method 200 is performed. For example, if the inertia takes into account the current number of connections from external client computing devices to each process, this number may be determined at the time that a process is to be moved between nodes.

The inertia can be dynamic in more sophisticated ways as well. For example, the inertia may take into account the expected number of connections from external client computing devices to each process during an expected period of unavailability when moving a process between nodes. Therefore, even though a given process may not currently have any connections from external client computing devices, based on historical records, it may be expected that a certain number of external client computing devices will try to connect with the process during the expected period of unavailability when moving a process between nodes. In this respect, machine learning approaches and other types of approaches may be employed to predict the inertia of each process.

The load of a node is the amount or portion of one or more hardware resources of the node that are currently being used to execute the processes running on the node. For example, the load of a node may be or include the percent utilization of the processors of the node by the process running on the node. As another example, the load of a node may be or include the amount of memory or the percent utilization of the memory of the node by the processes running on the node.

Once the process to move from a current node has been selected, and the new node to which the process is to be moved has been selected, the method 200 moves the process from the current node to the new node (204). This is achieved as follows in one embodiment. The process is terminated on the current node (206), such that it is no longer running on the current node. The process is then started on the new node (208), such that it then begins running on the new node. The process is inaccessible during the length for the process to be terminated on the current node and thereafter started on the new node.

It is noted that the movement approach described in relation to parts 206 and 208 differs from some existing migration approaches to move a process from a current node to a new node. Specifically, some existing migration techniques are able to move a process from a current node to a new node while maintaining the running state of the process. In such techniques, the process is never inaccessible during migration, such that the inventive notion of inertia is essentially irrelevant to these techniques.

By comparison, in parts 206 and 208, once a process begins to be terminated on the current node, the process is inaccessible. The process does not become available again until after it has been started on the new node. This is why the inventive notion of inertia in selecting which process is moved from the current node is important. Furthermore, the state of the process while the process is moved from the current node to the new node may or may not be maintained, so that the process for which there is the least impact in the process being unavailable is selected for movement. If the process's state is not maintained when the process is moved, then the process reverts to an initial, just-started state on the new node.

FIG. 3 shows a method 300 to implement part 202 of the method 200, according to an embodiment of the invention. The method 300 is described in relation to a number of processes running on a current node, where one of these processes is selected to be moved to a new node that is also selected. The processes in question can be just the singleton processes on the current node.

A current inertia is set to the lowest inertia of any process running on the current node (302). For example, the processes running on the current node may each have an inertia between one and ten. If there are five processes running on the current node with inertias of five, seven, two, two, and five, then the current inertia is set to two in part 302. The effective load of each node, including the current node, is also determined (304). The effective load of a given node is the load of the given node attributable to the processes running on the given node.

The following is then performed for each node (other than the current node) that has an effective load lower than the effective load of the current node (306). The nodes that have effective loads lower than the effective load of the current node are candidates from which to select the new node to which a process on the current node is to be moved from the current node. Furthermore, in one embodiment, part 306 is performed for each node (other than the current node) that has an effective load lower than the effective load of the current node, and that is willing to accept any process from the current node. For example, some nodes may have effective loads lower than the effective load of the current node, but may not be willing to accept any process from the current node. Such nodes may be reserved for special tasks, and therefore are not able to accept processes from other nodes like the current node.

The performance of part 306 is now described in relation to what is referred to herein as a given node, although part 306 is performed for each node that has an effective load lower than the effective load of the current node. The current load disparity for the given node is determined (308). The current load disparity is the effective load of the current node, minus the effective load of the given node. That is, the current load disparity is the difference between the effective load of the current node and the effective load of the given node.

For each process running on the current node at the current inertia, the following is performed (310). The potential load disparity if the process were moved from the current node to the given node is determined (312). That is, if the process were moved from the current node to the given node, then the effective loads of both the current node and the given node would change. As such, the load disparity—i.e., the difference between the effective load of the current node and the effective load of the given node—would also change. The difference between the current load disparity and this potential load disparity is also determined (314). This difference is determined by subtracting the potential load disparity from the current load disparity.

It is noted that in one embodiment, part 310 is performed for each process on the current node at the current inertia that the given node is willing to accept. For example, the given node may be willing to accept some processes from the current node, but not other processes. In such instances, part 310 is thus performed just for each process on the current node at the current inertia that the given node is willing to accept, and not for any process on the current node at the current inertia that the given node is not willing to accept.

The result of performing part 306 is a difference for each unique pair of a node having an effective load lower than the effective load of the current node and a process running on the current node, as determined in part 314. If the greatest such difference is positive (316), then the current node's process in relation to which this greatest difference was determined is selected, as the process to be moved from the current node (318). The node having an effective load lower than the effective load of the current node and in relation to which the greatest difference was determined in part 314 is also selected in part 318, as the new node to which the selected process is to be moved.

For example, the current node may have five processes one through five, and there may be two nodes A and B that have lower effective loads than the effective load of the current node. If the greatest difference is determined in part 314 in relation to process one and node B, then process one is selected as the node to move from the current node, and node B is selected as the new node to which to move this process. After performing part 318, the method 300 is finished, or in another embodiment the method 300 is repeated at part 304 after the selected process has been moved to the selected new node (320), such as by performing part 204 of the method 200 of FIG. 2.

However, if the greatest difference that was determined in part 314 is not positive (316)—meaning that all the differences determined in part 314 are zero or negative—then this means that there are no more processes running on the current node that can be selected to move from the current node. This also means that there are no more nodes having effective loads lower than the effective load of the current node that can be selected to which to move a process from the current node. In this case, if the current inertia is not the highest inertia of any process running on the current node (320), then the current inertia is increased to the next lowest inertia of any process running on the current node (322), and the method 300 is repeated at part 306.

For example, if there are five processes with inertias of five, seven, two, two, and five running on the current node, then the current inertia is initially set to two in part 302. If the part 322 is reached after having performed part 310 for processes running on the current node at the current inertia of two, then the current inertia is increased to five, and the method 300 is repeated at part 306. This is because the next lowest inertia of any process running on the current node, after the inertia of two, is five.

However, if the current inertia is already the highest inertia of any process running on the current node (320), then the method 300 is completed without potentially having selected any process to move from the current node, and without potentially having selected any node to which to a move a process from the current node. This scenario may occur where all the nodes have relatively large and/or substantially similar effective loads, in which case the processes on the nodes may not be able to be balanced further by moving a process from the current node to another node. Therefore, no process is moved from the current node to a new node.

FIGS. 4A and 4B show a method 400 to implement part 202 of the method 200 of FIG. 2, according to an embodiment of the invention. The method 400 is described in relation to a number of processes running on a current node, where one of these processes is selected to be moved to a new node that is also selected. The processes in question can be just the singleton processes on the current node.

The difference between the method 400 and the method 300 of FIG. 3 is as follows. In the method 300, all the processes having the current inertia are considered as candidates from which to select a process to move from the current node. By comparison, in the method 400, the processes running on the nodes are organized over a number of different groups having corresponding group numbers. When determining whether a process should be moved from the current node, just the processes of a group having a current (e.g., desired) group number are considered, from lowest inertia to highest inertia. Furthermore, an effective load for a given node is determined just in relation to the processes on the given node that are located within the group having the current group number (or the processes on the given node that are located within the groups having group numbers equal to or less than the current group number).

Therefore, the method 400 permits a greater granularity in determining which processes are considered as candidates from which to select a process to move the current node. For example, there may be three groups one, two, and three. There may further be a first node having four processes A, B, C, and D assigned to groups one, two, two, and one, respectively, and a second node having five processes E, F, G, H, and I assigned to groups three, three, two, one, and two, respectively. If the desired group is group two, and if a process is to be moved from the first node, then just processes B and C are considered as candidates to move from the first node. Furthermore, the effective loads for the first node and the second node are determined just in relation to the processes B and C and the processes F, H, and I, respectively.

In this respect, the method 300 of FIG. 3 is a special case of the method 400, in which all the processes running on all the nodes belong to the same group. In this case, the group number can be ignored, as is implicitly done in the method 300. However, where not all the processes running on all the nodes belong to the same group, and just the processes of a certain group are to be considered, then the method 400 is performed.

A current group number is set to a desired group number of any group including at least one process running on the current node (402). In one embodiment, the desired group number is the lowest group number of any group including at least one process running on the current node. This embodiment is especially relevant where if a process in the group corresponding to the current group number is not able to be selected to move from the current node, then the group having the next lowest group number can be considered, and so on.

A current inertia is set to the lowest inertia of any process running on the current node (404). The effective load of each node is then determined, based on the current group number (406). In one embodiment, the effective load of a given node is determined by considering just the processes running on the given node that are located within the group corresponding to the current group number. In another embodiment, the effective load of a given node is determined by considering the processes running on the given node that are located within the groups having group numbers equal to or less than the current group number.

For example, a given node may have two processes in group one, three processes in group two, and one process in group three. If the current group number is two, in one embodiment the effective load is determined by considering just the three processes in the group corresponding to group number two. For instance, if the effective load is defined as the percent utilization of the processors of the given node, then just the percent utilization of the processors of the given node attributable to the three processes in the group corresponding to group number two is determined as the effective load. The processes in groups one and three are not considered when determining the effective load in this embodiment.

In another embodiment, the effective load is determined by considering the three processes in the group corresponding to group number two, and the two processes in the group corresponding to group number one. For instance, if the effective load is defined as the percent utilization of the processors of the given node, then just the percent utilization of the processors of the given node attributable to the three processes in the group corresponding to group number two and to the to the two processes in the group corresponding to group number one is determined as the effective load. The process in group three is not considered when determining the effective load in this embodiment.

The following is then performed for each node (other than the current node) that has an effective load lower than the effective load of the current node (408). In one embodiment, part 408 is performed for each node (other than the current node) that has an effective load lower than the effective load of the current node, and that is willing to accept any process from the current node that is located within the group corresponding to the current group number. The performance of part 408 is described in relation to what is referred to herein as a given node, although part 408 is performed for each node that has an effective load lower than the effective load of the current node.

The current load disparity for the given node is determined (410). The current load disparity is the effective load of the current node, minus the effective load of the given node. For each process running on the current node at the current inertia and within the group corresponding to the current group number, the following is performed (412). The potential load disparity if the process were moved from the current node to the given node is determined (414), as has been described above in relation to part 312 of FIG. 3. The difference between the current load disparity and this potential load disparity is also determined (416). This difference is determined by subtracting the potential load disparity from the current load disparity.

It is noted that in one embodiment, part 412 is performed for each process on the current node at the current inertia and within the group corresponding to the current group number that the given node is willing to accept. For example, the given node may be willing to accept some processes within the group corresponding to the current group number from the current node, but not other processes. In such instances, part 412 is thus performed just for each process on the current node at the current inertia and within the group corresponding to the current group number that the given node is willing to accept, and not for any process on the current node at the current inertia that the given node is not willing to accept.

The result of performing part 408 is a difference for each unique pair of a node having an effective load lower than the effective load of the current node and a process running on the current node and within the group corresponding to the current group number, as determined in part 416. If the greatest such difference is positive (418), then the current node's process in relation to which this greatest difference was determined is selected, as the process to be moved from the current node (420). The node having an effective load lower than the effective load of the current node and in relation to which the greatest difference was determined in part 416 is also selected in part 420, as the new node to which the selected process is to be moved. After performing part 420, the method 400 is finished, or in another embodiment the method 400 is repeated at part 406 after the selected process has been moved to the selected new node (422), such as by performing part 204 of the method 200 of FIG. 2.

However, if the greatest difference that was determined in part 416 is not positive (418), and if the current inertia is not the highest inertia of any process running on the current node and within the group corresponding to the current group number (424), then the following is performed. The current inertia is increased to the next lowest inertia of any process running on the current node and within the group corresponding to the current group number (426). The method 400 is then repeated at part 408.

However, if the current inertia is already the highest inertia of any process running on the current node and within the group corresponding to the current group number (424), then this means that there are no more processes running on the current node and within the group corresponding to the current group number that can be selected to move from the current node. In the embodiment of FIGS. 4A and 4B, then, other groups are examined to locate processes running on the current node that can be selected to move from the current node. Therefore, if the current group number is not the highest group number of any process running on the current node (428), then the current group number is increased to the next lowest group number of any group including at least one process running on the current node, and the method is repeated at part 404 (430).

However, if the current group number is already the highest group number of any process running on the current node (428), then the method 400 is completed without potentially having selected any process to move from the current node, and without potentially having selected any node to which to a move a process from the current node. In an alternative embodiment, parts 428 and 430 are not present in the method 400, and part 424 proceeds to part 426 or to part 432, instead of to part 426 or to part 428 as depicted in FIG. 4B. This alternative embodiment is beneficial when just the processes within a desired group are to be considered as candidates to move from the current node, and not the processes within any other group, even if this results in no process being selected to move from the current node.

The load-balancing of processes that has been described above can be implemented in relation to disparate types of storage systems. Such storage systems may have to be put into place as a result of financial, health, privacy, and/or other types of regulations. For example, in the United States, the Securities and Exchange Commission now requires that certain types of financial data be archived in such a way that the data cannot be changed. Also in the United States, the Health Insurance Portability and Accountability Act (HIPAA) requires that certain types of patient data be afforded stringent privacy controls. The European Union has also implemented different types of privacy regulations that affect the maintenance of data.

Such regulations can be difficult to implement with existing storage systems. However, embodiments of the present invention ease such implementation. In particular, the processes that are load balanced in accordance with embodiments of the invention can be read/write processes that move data among various storage systems so that these regulations can be satisfied. The read/write processes may be considered as being implemented within an overarching distributed storage system that has various and potentially disparate types of storage subsystems that were not originally developed to work together and with one another.

For example, the storage subsystems may be organized over a variety of different hierarchical tiers, where given types of data may have to be stored on a given tier, and the data moved between tiers as required by who can access the data and for how long the data is to be retained. Read/write processes may be instantiated and deployed on the various storage subsystems on an as-needed basis, such that the processes are not all kept alive at all times (i.e., the processes are not all running at all times). However, instantiation or creation of a given read/write process may result in other processes having to be load-balanced, which can be achieved in accordance with embodiments of the present invention. The processes thus permit disparate storage subsystems that were not originally developed to work together to nevertheless work one another to realize a desired data retention policy, as may be required by various financial, health, privacy, and/or other regulations.

As can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A method comprising:
   selecting a process to move from a current node of a plurality of nodes to a new node of the plurality of nodes, based on an inertia of the process; and
   moving the process from the current node to the new node,
   wherein the inertia of the process is a quantified measure of an impact resulting from the process being inaccessible while being moved from the current node to the new node,
   wherein a plurality of processes are running on the current node, and wherein selecting the process to move from the current node to the new node comprises:
   for each node of the plurality of the nodes, determining an effective load of the node;
   setting a current inertia to a lowest inertia of any process running on the current node;
   for each node of the plurality of the nodes for which the effective load is less than the effective load of the current node,
   determining a current load disparity as equal to a difference between the effective load of the current node and the effective load of each node;
   for each process running on the current node at the current inertia,
      determining a potential load disparity if the process were moved from current node to the node;
      determining a difference between the current load disparity and the potential load disparity;
   where a greatest difference is positive, selecting the process for which the difference is greatest as the process to move from the current node to the new node; and
   where the greatest difference between the current load disparity and the potential load disparity is not positive, increasing the current inertia to a next lowest inertia of any process running on the current node.

2. The method of claim 1, wherein the process is a singleton process, in that the process at any given time runs on just one node of the plurality of nodes, as opposed to being distributed over more than one node of the plurality of nodes.

3. The method of claim 1, wherein the inertia takes into account a number of connections to the process from outside the plurality of nodes, wherein the larger the number of connections is, the greater the inertia.

4. The method of claim 1, wherein the inertia takes into account an extent to which the process accepts connections from outside the plurality of nodes, wherein the greater the extent to which the process accepts connections from outside the plurality of nodes is, the greater the inertia.

5. The method of claim 1, wherein the inertia takes into account a desired availability of the process, wherein the greater the desired availability is, the greater the inertia.

6. The method of claim 1, wherein the inertia takes into account a specified quality of service of the process, wherein the higher the specified quality of service is, the greater the inertia.

7. The method of claim 1, wherein the inertia is static and specified by a user.

8. The method of claim 1, wherein the inertia is dynamic and periodically redetermined.

9. The method of claim 1, wherein moving the process from the current node to the new node comprises:
   terminating the process on the current node such that the process no longer runs on the current node; and,
   starting the process on the new node,
   wherein the process is inaccessible after the process has been terminated on the current node and before the process has been started on the new node.

10. The method of claim 1, wherein the method is performed by just one node of the plurality of nodes.

11. The method of claim 1, wherein the method is symmetrically performed by more than one node of the plurality of nodes.

12. A non-transitory computer-readable storage medium having computer-readable code stored thereon for execution by a processor of a computing device, the computer-readable code comprising:
   computer-readable code to select a process to move from a current node of a plurality of nodes to a new node of the plurality of nodes, based on an inertia of the process; and
   computer-readable code to move the process from the current node to the new node,
   wherein the inertia of the process is a quantified measure of an impact resulting from the process being inaccessible while being moved from the current node to the new node,
   wherein a plurality of processes are running on the current node, and wherein the process to move from the current node to the new node is selected by:
   for each node of the plurality of the nodes, determining an effective load of the node;
   setting a current inertia to a lowest inertia of any process running on the current node;
   for each node of the plurality of the nodes for which the effective load is less than the effective load of the current node,
      determining a current load disparity as equal to a difference between the effective load of the current node and the effective load of each node;
      for each process running on the current node at the current inertia,
         determining a potential load disparity if the process were moved from current node to the node;
         determining a difference between the current load disparity and the potential load disparity;
      where a greatest difference is positive, selecting the process for which the difference is greatest as the process to move from the current node to the new node; and
      where the greatest difference between the current load disparity and the potential load disparity is not positive,
         increasing the current inertia to a next lowest inertia of any process running on the current node.

13. The non-transitory computer-readable storage medium of claim 12, wherein the inertia takes account into one or more of:
   a number of current connections to the process from outside the plurality of nodes, wherein the larger the number of current connections is, the greater the inertia is;
   an extent to which the process accepts connections from outside the plurality of nodes, wherein the greater the extent to which the process accepts connections from outside the plurality of nodes is, the greater the inertia is;
   a desired availability of the process, wherein the greater the desired availability is, the greater the inertia is;

a specified quality of service of the process, wherein the higher the specified quality of service is, the greater the inertia.

14. A computing system comprising:
a plurality of nodes including a current node and a new node, each node comprising a processor;
computer-readable code executed by the processor of at least one of the nodes, to select a process to move from the current node to the new node, based on an inertia of the process, and to move the process from the current node to the new node,
wherein the inertia of the process is a quantified measure of an impact resulting from the process being inaccessible while being moved from the current node to the new node,
wherein a plurality of processes are running on the current node, and wherein the process to move from the current node to the new node is selected by:
for each node of the plurality of the nodes, determining an effective load of the node;
setting a current inertia to a lowest inertia of any process running on the current node;
for each node of the plurality of the nodes for which the effective load is less than the effective load of the current node,
    determining a current load disparity as equal to a difference between the effective load of the current node and the effective load of each node;
for each process running on the current node at the current inertia,
    determining a potential load disparity if the process were moved from current node to the node;
    determining a difference between the current load disparity and the potential load disparity;
where a greatest difference is positive, selecting the process for which the difference is greatest as the process to move from the current node to the new node; and
where the greatest difference between the current load disparity and the potential load disparity is not positive,
    increasing the current inertia to a next lowest inertia of any process running on the current node.

15. The computing system of claim 14, wherein the computing system is a storage system comprising a plurality of storage subsystems, the storage subsystems being disparate storage subsystems in that the storage subsystems are not originally designed to work together within the storage system, each storage subsystem including one or more of the nodes, the process being a read/write process to one or more of store data on one of the storage subsystems and move data among the storage subsystems.

* * * * *